US006980418B1

(12) United States Patent
Seeger et al.

(10) Patent No.: US 6,980,418 B1
(45) Date of Patent: *Dec. 27, 2005

(54) METHOD AND APPARATUS FOR CONTROLLING THE TEMPERATURE OF ELECTRONIC DEVICE ENCLOSURES

(75) Inventors: Mark E. Seeger, Troy, NY (US); John DiFonzo, Emerald Hills, CA (US); Chris Ligtenberg, San Carlos, CA (US); Zachary Zeliff, Troy, NY (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/899,576

(22) Filed: Jul. 26, 2004

Related U.S. Application Data

(63) Continuation of application No. 10/140,748, filed on May 6, 2002, now Pat. No. 6,819,559.

(51) Int. Cl.[7] .............................................. H05K 5/00
(52) U.S. Cl. ...................... 361/679; 361/713; 126/684; 438/758; 493/903; 174/35 R
(58) Field of Search ................................. 361/687–688, 361/713, 816, 818; 126/684–687; 438/758–764; 493/903; 174/35 R, 35 MS

(56) References Cited

U.S. PATENT DOCUMENTS

| 5,027,061 A | 6/1991 | Palmer et al. ............... 324/156 |
| 5,898,567 A * | 4/1999 | Satake ......................... 361/687 |
| 6,347,035 B1 * | 2/2002 | Hamano et al. ............ 361/687 |
| 6,859,364 B2 * | 2/2005 | Yuasa et al. ................ 361/687 |
| 2003/0117787 A1 * | 6/2003 | Nakauchi |

* cited by examiner

Primary Examiner—Yean-Hsi Chang
(74) Attorney, Agent, or Firm—Beyer Weaver & Thomas LLP

(57) ABSTRACT

An electronic device housing comprising a device enclosure with electronic components mounted inside the enclosure is disclosed. Mounted between the electronic device housing and the device enclosure is a thermally reflective electrical insulator configured to reduce external heating of the enclosure by the electronic components contained therein. Such an arrangement reflects heat generated by internal electronic components back inside the device enclosure, thereby reducing the external temperature of the electronic device housing. The electronic device housing, for example, pertains to a portable computer. Additionally, a method for reducing the external temperature of a computer housing for a portable computer is disclosed.

13 Claims, 3 Drawing Sheets

METHOD AND APPARATUS FOR CONTROLLING THE TEMPERATURE OF ELECTRONIC DEVICE ENCLOSURES

RELATED APPLICATIONS

This application is a continuation of prior U.S. application Ser. No. 10/140,748, entitled "METHOD AND APPARATUS FOR CONTROLLING THE TEMPERATURE OF ELECTRONIC DEVICE ENCLOSURES", filed on May 6, 2002 Now U.S. Pat. No. 6,819,559, which is incorporated by reference.

TECHNICAL FIELD

The invention described herein relates generally to electronic device enclosures. More particularly, the invention relates to thermal control of enclosures for portable computing devices.

BACKGROUND

The computer industry is moving toward smaller, faster, and more compact electronic systems. Nowhere is this more true than in the field of compact portable computer systems (e.g., laptop, notebook, or sub-notebook computers).

Conventional computer systems include numerous interconnected electronic components configured to accomplish a variety of different computing tasks. These electronic components are generally mounted on circuit boards contained within an enclosure or housing that (among other things) protects the components from damage. In portable computer systems, the housing serves as a carrying case and frequently includes the keyboard. As is known, housings of such portable computer systems are smaller than most "desktop" computers.

One of the important concerns in the design of computer housings is the need for adequate cooling of the electrical components during computer operation. Conventional designs address this concern by using cooling fans, heat sinks, vents, radiative cooling, and other cooling means to reduce the inside temperature of the housing, thereby preventing the overheating of the internal electronic components. In any case, these conventional approaches are directed toward removing heat from the inside of the housing in order to adequately cool the inside of the housing. Some cooling is achieved through heating and radiative cooling of the housings. However, there is an upper limit to the amount of heat that can be transferred to such housings. In a 25° C. ambient, the UL (Underwriters Laboratory) has set a maximum external surface temperature for plastic housings at 80° C. and for metal housings the maximum external surface temperature is 60° C.

As computers become faster, operating temperatures of the electrical components tend to go up. With each new generation of computers, thermal solutions become increasingly important. This becomes especially so in portable computers which are becoming smaller and smaller, thereby confining greater amounts of heat in smaller spaces.

FIG. 1 depicts a typical portable computer 1. The depicted portable computer 1 includes a display 11 and a housing 10. In order to maintain light weight and low cost, many portable computers use plastic housings 10. Such plastic housings are relatively strong and absorb heat generated by the microprocessors and other components of the computer system during operation. However, in the continuing drive for ever thinner portable computers, stronger materials are required to give the necessary strength and resilience to the thinner computer housings. Metals can be used to provide a thinner, yet sufficiently strong, housing.

FIG. 2 is a cross-section view of a computer housing 10'. The depicted metal computer housing 10' is constructed of, for example, titanium. Mounted inside the housing are internal electronic components. Various electronic components are shown mounted on a circuit board 21, for example, a Main Logic Board. Underlying the circuit board 21 is a sheet of electrically insulating material 22. Commonly, insulating material 22 is a thin sheet of black polyester material (i.e., Mylar®) whose primary purpose is to electrically insulate the circuit board 21 from contact with the inner surface of the metal housing 10'. During ordinary course of use, the housing 10' can be subjected to some degree of mechanical flexing and bending. In the absence of the insulating material 22, electrical contacts or the electronic components on the circuit board 21 can come into contact with the metal housing 10', which could possibly electrically short the system. Additionally, the insulating material 22 absorbs heat generated by the electronic components. One problem with such designs is that the insulating material 22 becomes very hot during system use. This heat is transferred from the polyester insulator 22 to the housing 10' where the external housing surface temperature can undesirably exceed the UL heat specification. Still worse, if the housing 10' becomes too hot, it can be uncomfortable for the user or can cause heat damage to furniture upon which the computer rests. This problem is exacerbated by the higher operating temperatures of the newer, faster computers. Furthermore, as the profile of these housings 10' becomes even slimmer, electronic components come into closer proximity to the insulating material 22, again increasing the temperature of the housing 10'.

Therefore, there is need for a method and apparatus that reduce the external temperature of computer (or other electronic device) housings.

SUMMARY OF THE INVENTION

In accordance with the principles of the present invention, a method and apparatus for reducing the external temperature of an electronic device housing is disclosed herein.

One embodiment of the invention includes an electronic device housing having a device enclosure with an electronic component mounted inside the enclosure. Inside the enclosure is a thermally reflective structure arranged between the electronic component and the enclosure to reduce enclosure heating by the electronic device. In one particular embodiment, the thermally reflective structure is electrically insulating. A substantially electrically non-conductive thermally reflective first layer and an adhesive second layer that affixes the thermally reflective electrical insulator to an inner surface of the housing.

In another embodiment, the invention comprises a portable computer having a computer housing and an electronic processor mounted inside the housing. The housing includes a thermally reflective layer arranged between the electronic processor and the housing to reduce heating of the housing by the electronic processor.

Yet another embodiment of the invention includes a method for reducing the external temperature of a portable computer housing having electronic components mounted therein. The method includes the operations of arranging a thermally reflective electrical insulator inside the housing between the electronic components and the housing and reflecting heat generated by the electronic components back inside the computer housing thereby reducing the exterior temperature of the computer housing.

These and other aspects of the invention will be disclosed in greater detail in the following detailed description.

BRIEF DESCRIPTION OF THE DRAWINGS

The following detailed description will be more readily understood in conjunction with the accompanying drawings, in which.

It is to be understood that in the drawings like reference numerals designate like structural elements. Also, it is understood that the depictions in the drawings are not necessarily to scale.

DETAILED DESCRIPTION OF THE DRAWINGS

The present invention is shown and described below with respect to certain embodiments and specific features thereof. The embodiments set forth hereinbelow are to be taken as illustrative rather than limiting. It should be readily apparent to those of ordinary skill in the art that various changes and modifications in form and detail may be made without departing from the spirit and scope of the invention.

Figure 1:
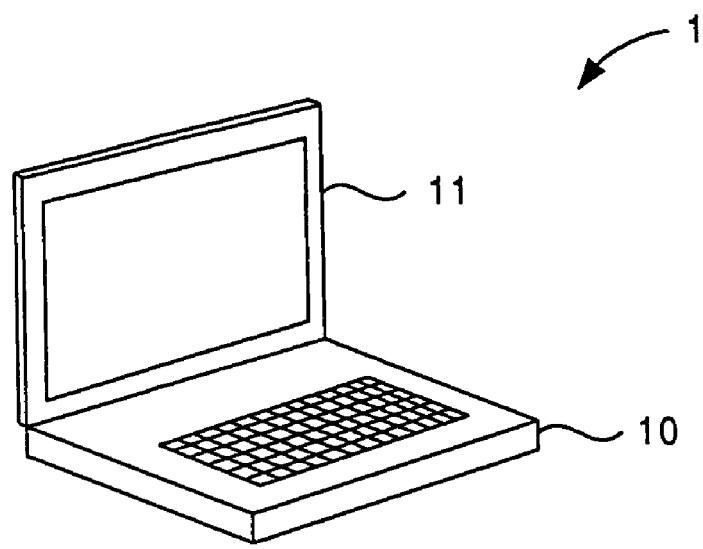
FIG. 1 is a figurative depiction of a portable "laptop" computer.
Figure 2:
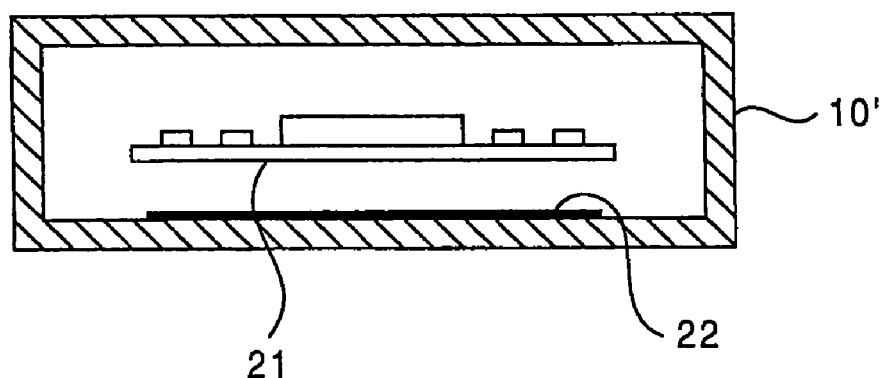
FIG. 2 is a cross-sectional view of the inside of a conventional portable computer housing, for example, such as that shown in FIG. 1.
Figure 3:
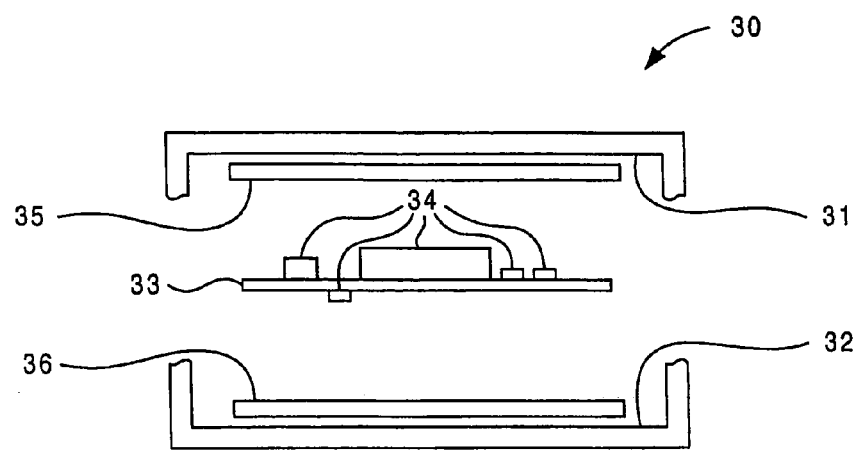
FIG. 3 is an exploded cross-section view of the inside of a portable computer embodiment in accordance with the principles of the present invention.

The following detailed description pertains to an embodiment of an electronic component housing that includes a thermally reflective electrical insulator in accordance with the principles of the present invention. FIG. 3 depicts an exploded section view of an embodiment of an electronic component housing 30 in accordance with the principles of the present invention. The housing 30 is shown having a top inner surface 31 and a bottom inner surface 32. The housing 30 can be constructed of metal, plastic, or other suitable materials. A plurality of internal electronic components 34 are mounted on a circuit board 33. The circuit board 33 and, thus, the electronic components 34 are provided within the house 30. The housing 30 also includes a top thermally reflective electrical insulator 35 and a bottom thermally reflective electrical insulator 36. The top thermally reflective electrical insulator 35 is positioned between the circuit board 33 and the top inner surface 31 of the housing 30. The bottom thermally reflective electrical insulator 36 is positioned between the circuit board 33 and the bottom inner surface 32 of the housing 30.

In general, the thermally reflective electrical insulators can be used with/on any one or more of the surfaces of the housing 30. In some embodiments, the thermally reflective electrical insulators can be mounted on any of the inner surfaces of the housing. For example, the sides can also be covered with thermally reflective electrical insulators. In another desirable embodiment, only one thermally reflective electrical insulator 36 is used on the bottom of the housing 32.

The purpose of the thermally reflective electrical insulators 35, 36 is to reflect heat away from the inner surfaces 31, 32 of the housing 30. Additionally, the thermally reflective electrical insulators 35, 36 are to provide electrical insulation between the circuit board 33 (and the electronic components 34 thereon) and the inner surfaces 31, 32 of the housing 30.

The thermally reflective electrical insulators 35, 36 constructed in accordance with the principles of the present invention are able to reflect heat by having low emissivity. In particular, according to one embodiment, thermally reflective electrical insulators 35, 36 have low emissivity at wavelengths in the range of about 700 nm (nanometers) to about 1,500 nm.

The prior art insulators do provide electrical insulation, but disadvantageously they also absorb excessive amounts of heat from the circuit board and electronic circuitry. This absorbed heat is transferred to the housing where it can cause excessive heating of the housing. The black polyester used in conventional insulators has very high emissivity. Therefore, conventional insulators readily absorb heat that is disadvantageously transferred to the housing.

Figure 4:
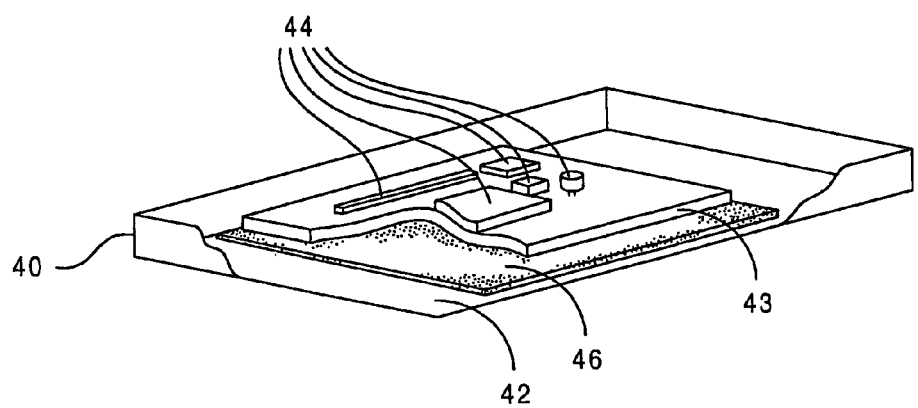
FIG. 4 is cut-away perspective view of an embodiment of the present invention portable computer housing shown with the top removed.

FIG. 4 is a cut-away perspective view of an embodiment of a computer housing 40 (with the top removed) showing the internal electronics (e.g., circuit board 43 and electronic components 44) and a thermally reflective electrical insulator 46. In this embodiment, the housing 40 is metal (e.g., titanium). The thermally reflective electrical insulator 46 is positioned underneath the circuit board 43. As shown, the thermally reflective electrical insulator 46 is positioned between the internal electronics (e.g., circuit board 43 and electronic components 44) and the bottom inner surface 42 of the housing 40. In this way, the thermally reflective electrical insulator 46 reflects heat away from the housing while still preventing the internal electronics from electrically shorting out against the metal of the housing.

Figure 5:
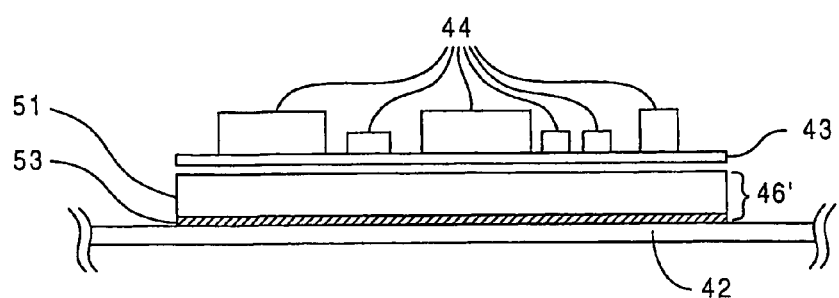
FIG. 5 is a cross-section view of a portion of the inside of a portable computer embodiment showing a circuit board and a thermally reflective electrical insulator constructed in accordance with the principles of the present invention.

FIG. 5 is a cross-section view of a portion of computer housing 42 showing associated electronic components and a thermally reflective electrical insulator 46' (e.g., similar to that shown in FIG. 4). In one thermally reflective electrical insulator 46' embodiment, a first layer 51 is composed of a thermally reflective substantially electrically non-conducting layer. One embodiment of the first layer 51 includes a very thin (on the order of a few microns thick) substrate of electrically insulating material having suspended therein infrared reflective particles. In the depicted embodiment, the first layer comprises a very thin layer of electrically insulating material. One family of suitable substrate materials are polyesters. This includes but is not limited to polyethylene terephthalate, also referred to as PET. Other materials having good electrical insulation properties may also be used. Suspended within the electrically insulating material is a reflective material having high reflectivity at infrared wavelengths. One particularly suitable reflective material is aluminum (Al) which is very reflective at infrared wavelengths. The advantage of using a material where the reflective material is suspended in a non-conductive substrate is that the reflective properties of one material can be combined with the electrically insulating properties of another. This results in a very thin thermally reflective electrical insulating layers. Due to the electrical insulation properties of such layers, electronic components do not electrically short circuit if they come into physical contact with such layers. Alternative approaches and materials will be discussed hereinbelow.

The first layer 51 is formed on a second layer 52. In the depicted embodiment, the second layer 52 includes an adhesive material formed on the bottom of the first layer 51. The entire structure for the thermally reflective electrical insulator 46' is very thin, on the order of 0.1 to 0.2 mm thick. It should be appreciated that thermally reflective electrical insulators of both greater and lesser thicknesses can be used to practice the invention. One suitable thermally reflective electrical insulator is an aluminized PET film manufactured by Avery-Dennison of Pasadena, Calif. In one implementation, a 0.12 mm thick aluminized PET film can be provided with an adhesive backing (Product No. 9469 manufactured by 3M of St. Paul, Minn.) with a peel off release sheet, suitable for practicing the invention.

Figure 6A:
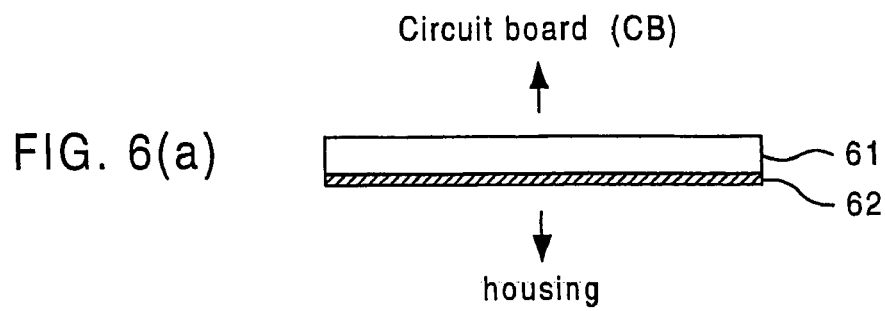
FIGS. 6(a)–6(d) are cross-section views of various embodiments of thermally reflective layers including embodiments of thermally reflective electrical insulators in accordance with the principles of the present invention.

Reference is now made to FIGS. 6(a)–6(d), which depict a number of different reflective structural embodiments that can be used to reflect heat away from a computer housing. FIG. 6(a) depicts a thermally reflective electrical insulator as described with respect to FIG. 5. A first layer 61 is composed of a thin layer of thermally reflective material that is substantially electrically non-conducting. This first layer 61 is designed to reflect radiation in infrared wavelengths. A typical first layer 61 includes a thin layer of electrically insulating material. In one example, PET is used in the first layer 61. Other electrically insulating materials can also be used. Suspended within the layer of electrically insulating material are particles of reflective material. The electrically insulating material electrically insulates the suspended particles of reflective material (which are in many cases conductive). Suitable particles of reflective material include, but are not limited to aluminum, copper, and gold. When such first layers 61 are mounted inside computer housings, they prevent electronic components from short circuiting if they come into electrical contact with the first layer 61. A second layer 62 is composed of an adhesive formed on the bottom of the first layer 61. A number of different adhesives can be used. The entire structure (for the layers 61 and 62) is very thin, on the order of 0.1 to 0.2 mm thick. As shown, the first layer 61 is closest to the circuit board (CB) and the second layer 62 is closest to the housing. In most cases the second layer 62 is affixed directly to an inner surface of the housing.

Figure 6B:
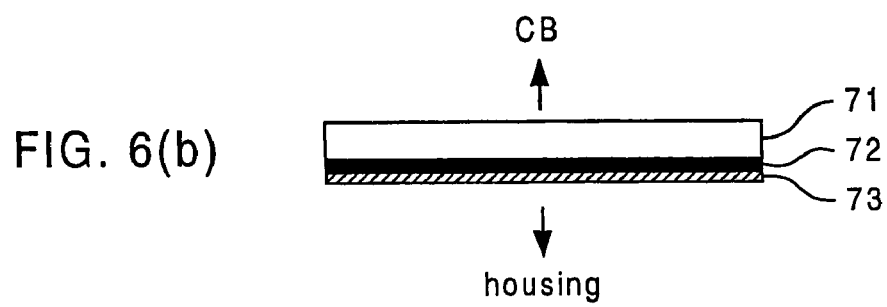

FIG. 6(b) depicts another approach for a thermally reflective electrical insulator. A first layer 71 is composed of a thermally transmissive material that is electrically non-conducting. This first layer 71 is designed to allow infrared radiation to pass through the first layer 71 onto the underlying layers. Suitable materials include, but are not limited to infrared wavelength transmissive optical glasses or infrared optical coatings. The first layer 71 is also constructed such that it is substantially electrically non-conductive. This prevents the electronic components from short circuiting if they come into electrical contact with the first layer 71. A second layer 72 is formed on the first layer 71. Embodiments of the second layer 72 comprise a layer of thermally reflective material. Suitable materials are materials having low infrared emissivity including, but are not limited to, aluminum, copper, gold, nickel, silver, as well as other materials. Even certain specular ceramic materials can be used. A third layer 73 is composed of an adhesive formed on the bottom of the second layer 72. As above, a number of different adhesives can be used. Again, the entire structure can be very thin. As shown, the first layer 71 is closest to the circuit board (CB) and the third layer 73 is closest to the housing. In most cases, the third layer 73 is affixed directly to an inner surface of the housing.

Figure 6C:
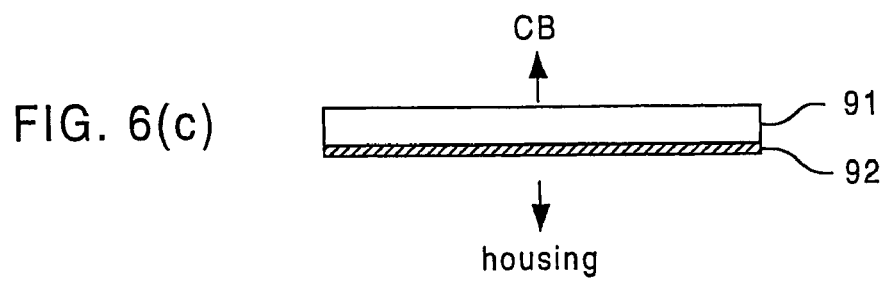

FIG. 6(c) depicts yet another embodiment. The depicted embodiment is a thermal reflector that is not electrically insulating. A first layer 91 is composed of a thermally reflective material that is substantially electrically conducting. The first layer 91 is positioned close to the circuit board (CB) to reflect heat away from the housing. This first layer 91 is designed to reflect radiation in infrared wavelengths. Suitable thermally reflective materials include, but are not limited to, thin foils of aluminum, copper, or gold. A second adhesive layer 92 is formed on the bottom surface of the first layer 91. A number of different adhesives can be used. The entire can be very thin, on the order of 0.2 mm or less. The adhesive second layer 92 can be used to affix the thermal reflector to an inner surface of the housing, thereby positioning the first layer 91 closest to the circuit board and the adhesive second layer 92 is closest to the housing.

Figure 6D:
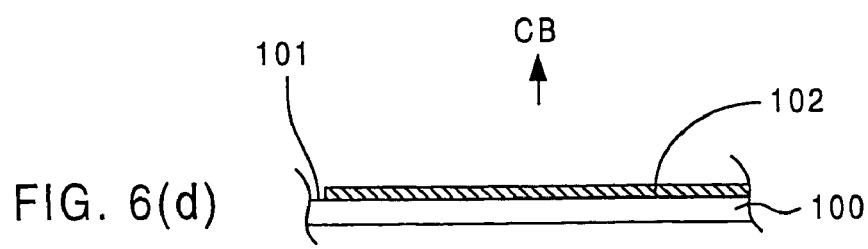

Yet another approach is depicted in the embodiment shown in FIG. 6(d). An inner surface 101 of a housing 100 is polished such that it is highly reflective to infrared wavelengths. This is particularly useful when used with embodiments having aluminum housings. Alternatively, the inner surface 101 of a housing 100 can have a thin layer of highly reflective material formed thereon. One example is a thin layer of aluminum formed on the inner surface 101 of the housing 100. Many other infrared reflective materials (e.g., copper or gold) or combinations of materials can be similarly formed on the inner surface 101 of the housing. A layer of thermally transparent electrically non-conductive material 102 is then formed over the thermally reflective layer. Such a layer of thermally transparent electrically non-conductive material 102 can be formed using a variety of materials (e.g., infrared transmissive optical glass).

It should be noted that each of the embodiments discussed in FIGS. 6(a)–6(d) can be used to practice the principles of the invention. It is also to be noted that the thermally reflective layers and thermally reflective electrical insulators taught herein can be used with a wide variety of electronic devices including, but not limited to, computers, portable computers, hand-held electronic devices, music devices, game players, and the like.

Although, the detailed description pertains to embodiments of a portable computer, the inventors expressly contemplate that the principles of the invention can be practiced on a wide range of other electronic devices including, but not limited to, desktop computers, electronic gaming devices, and personal digital assistants (PDA's). The present invention has been particularly shown and described with respect to certain preferred embodiments and specific features thereof. However, it should be noted that the above-described embodiments are intended to describe the principles of the invention, not limit its scope. Therefore, as is readily apparent to those of ordinary skill in the art, various changes and modifications in form and detail may be made without departing from the spirit and scope of the invention as set forth in the appended claims. Other embodiments and variations to the depicted embodiments will be apparent to those skilled in the art and may be made without departing from the spirit and scope of the invention as defined in the following claims. In particular, it is contemplated by the inventors that the thermally reflective layers and thermally reflective electrical insulators can be used with a wide range of electronic devices beyond portable computers. Further, reference in the claims to an element in the singular is not intended to mean "one and only one" unless explicitly stated, but rather, "one or more". Furthermore, the embodiments illustratively disclosed herein can be practiced without any element which is not specifically disclosed herein.

We claim:

1. An electronic device housing comprising:
   a device enclosure;
   an electronic component mounted inside the enclosure; and
   a thermally reflective structure arranged between the electronic component and the enclosure to reduce enclosure heating by the electronic component wherein the thermally reflective electrical structure comprises a layered structure having an electrically insulating thermally transmissive first layer and a thermally reflective second layer arranged such that the first layer is positioned between the electronic component and the second layer, and the second layer is positioned between first layer and an inner surface of the enclosure.

2. The electronic device housing of claim 1 wherein the thermally reflective structure has low emissivity at wavelengths in the range of about 700 nanometers to about 1500 nanometers.

3. The electronic device housing of claim 2 wherein the thermally reflective structure is configured to reflect heat generated by the electronic component back inside the enclosure.

4. The electronic device housing of claim 1 wherein the electronic device is a portable computer.

5. The electronic device housing of claim 1 wherein the thermally reflective second layer comprises a thin layer of substantially electrically non-conductive material having a reflective material suspended therein.

6. The electronic device housing of claim 1 wherein the thermally reflective second layer includes a polyester material.

7. The electronic device housing of claim 6 wherein the reflective material suspended in the thin layer of polyester material includes aluminum.

8. The electronic device housing of claim 1 wherein the electrically insulating thermally transmissive first layer comprises an infrared transmissive glass material.

9. The electronic device housing of claim 1 wherein the thermally reflective structure reduces the heating of a bottom surface of the computer housing.

10. The electronic device housing of claim 1 wherein the thermally reflective second layer is comprised of a specular ceramic material.

11. The electronic device housing of claim 1 wherein the thermally reflective second layer comprises an aluminized PET (polyethylene terephtalate) film.

12. An electronic device housing comprising:
    a device enclosure;
    an electronic component mounted inside the enclosure; and
    a thermally reflective electric insulator arranged between the electronic component and the enclosure configured to reduce enclosure heating by the electronic component and configured to reflect heat generated by the electronic component back inside the enclosure, wherein the thermally reflective electrical insulator comprises a layered structure having an electrically insulating thermally transmissive first layer and a thermally reflective second layer arranged such that the first layer is positioned between the electronic component and the second layer, and the second layer is positioned between first layer and an surface of the enclosure.

13. The electronic device housing of claim 12 wherein the thermally reflective second layer comprises an aluminized PET (polyethylene terephtalate) film.

* * * * *